(12) United States Patent
Djouider

(10) Patent No.: US 11,603,325 B1
(45) Date of Patent: Mar. 14, 2023

(54) ELECTRO-FENTON PROCESS FOR REMOVING SILICA FROM WATER

(71) Applicant: King Abdulaziz University, Jeddah (SA)

(72) Inventor: Fathi Djouider, Jeddah (SA)

(73) Assignee: KING ABDULAZIZ UNIVERSITY, Jeddah (SA)

(*) Notice: Subject to any disclaimer, the term of this patent is extended or adjusted under 35 U.S.C. 154(b) by 0 days.

(21) Appl. No.: 17/727,864

(22) Filed: Apr. 25, 2022

(51) Int. Cl.
*C02F 1/60* (2023.01)
*C02F 1/461* (2023.01)
*C02F 103/06* (2006.01)

(52) U.S. Cl.
CPC ............ *C02F 1/60* (2013.01); *C02F 1/46109* (2013.01); *C02F 2001/46128* (2013.01); *C02F 2001/46138* (2013.01); *C02F 2103/06* (2013.01)

(58) Field of Classification Search
CPC ...... C02F 1/40; C02F 1/36; C02F 1/32; C02F 1/60; C02F 1/78; C02F 1/46
See application file for complete search history.

(56) References Cited

U.S. PATENT DOCUMENTS

2018/0009681 A1* 1/2018 Cam .................... B03C 11/00
2021/0155514 A1   5/2021 Alshawabkeh et al.

FOREIGN PATENT DOCUMENTS

WO   WO-2012136064 A1 * 10/2012 ............... C02F 1/40

OTHER PUBLICATIONS

Akyol et al., "A comparative study of electrocoagulation and electro-Fenton for treatment of wastewater from liquid organic fertilizer plant", Separation and Purification Technology, vol. 112, Jul. 10, 2013, pp. 11-19.
Den et al., "Removal of silica from brackish water by electrocoagulation pretreatment to prevent fouling of reverse osmosis memranes", Separation and Purification Technology, vol. 59, Issue 3, Mar. 1, 2008, pp. 318-325.
Heidari et al., "Application of Electro-Fenton (EF) Process to the Removal of Pentachlorophenol from Aqueous Solutions", Iranian Journal of Oil & Gas Science and Technology, vol. 4, pp. 76-87 (2015).
Villegas-Mendoza et al., "Electrocoagulation to remove silica from cooling towers water", Water Technology and Sciences, vol. V, No. 3, May-Jun. 2014, pp. 41-50.
Xu et al., "Advancements in the Fenton Process for Wastewater Treatment", Advanced Oxidation Processes—Applications, Trends, and Prospects, Chapter 4 (2020).

* cited by examiner

Primary Examiner — Walter D. Griffin
Assistant Examiner — Cameron J Allen
(74) Attorney, Agent, or Firm — WCF IP

(57) ABSTRACT

A method for removing silica from an aqueous solution is provided. The method includes steps of flowing the aqueous solution into an electro-Fenton reactor, wherein the reactor comprises one or more electrodes in a bipolar arrangement positioned between a monopolar iron anode and a monopolar cathode; applying an electric current to the aqueous solution such that silica aggregates form on ferric hydroxide; and removing the silica aggregates from the aqueous solution.

7 Claims, 5 Drawing Sheets

ELECTRO-FENTON PROCESS FOR REMOVING SILICA FROM WATER

FIELD OF THE INVENTION

The invention generally relates to electro-Fenton methods for removing silica from water. In particular, the methods allow for the avoidance of scaling of reverse osmosis membranes prior to desalination.

BACKGROUND OF THE INVENTION

In the 1900s, 200 million people (14% of worldwide population) lived in regions with moderate water scarcity. This figure soared to over 2 billion in the nineteen eighties (40% of worldwide population) and reached 3.8 billion people (60% of worldwide population) by the 2000s (Kummu et al., 2016). By 2025, two-thirds of the world's population could be living under water stressed conditions and an estimated 1.8 billion people will face absolute water shortage (United Nations, 2012).

The rapid population growth, higher standards of living, and industrialization have increased the water demand in almost any area in the world to dramatic levels. Around 90% of the global water consumption is for agricultural purpose, especially in South Asia (96-98%) due to extensive rice cultivation (Biemans et al., 2013) and in the Middle East and North Africa, due to the drought stress (Kummu et al., 2016).

Because of their harsh climate conditions, many countries around the world suffer an absolute water scarcity, for example Algeria, Chili, and Saudi Arabia where the rainfall is one of the lowest in the world (<95 mm annual average) (Almazroui et al., 2014). For instance, most of the inland towns in Saudi Arabia rely entirely for their domestic, industrial and agricultural purposes, on the underground water from the deep non-renewable brackish aquifers (Velis et al., 2017, Siebert et al., 2010) formed some 550 M years ago during the Paleozoic era (Lloyd and Pim, 1990). With a global reserve evaluated above 700 billion $m^3$ and with an average renewal rate from rainfall of 900 million $m^3$, these deep aquifers are rapidly depleting (Chowdhury and Al-Zahrani, 2015).

These waters are usually organic compound and biological species-free but high in total dissolved solids, mainly silica, where the concentration can reach 1000 mg/l (Maadhah and Wojcik, 1981). Before being used, brackish groundwater must be desalinated. Reverse Osmosis (RO) membrane technology is one of the main implemented methods worldwide (Greenlee et al., 2009, Henmi et al., 2010; Wenten and Khoiruddin, 2016) with energy cost about 1.7 kWh/$m^3$, which is one of the lowest in water production technologies (Xu et al., 2013) It involves forcing salty water through a semi-permeable membrane to extract dissolved salts using the natural process of osmosis (Greenlee et al., 2009).

However, due to the high silica content of the underground brackish water (Salvador Cob et al., 2014; Semiat et al., 2003), silica deposition inevitably occurs on the membrane surface and causes very serious and challenging concerns in the cost-effectiveness of this fresh-water production process. Performance of RO membranes are considerably altered. Removing silica is very costly, up to 80% of the operating cost in a water treatment plant (Pedenau and Dang, 2008). Various treatment processes for silica removal exist: coagulation with metal hydroxides (Salvador Cob et al., 2014; Semiat et al., 2003), flocculation (Liu et al., 2014), nanofiltration (Molinari et al., 2001) and using antiscaling chemicals (Ning et al., 2005). Even if the RO membrane penetrability is somewhat restored using antiscaling chemicals, the water recovery remains significantly low (Nguyen et al., 2012).

Thus, new methods for removing silica from brackish water are needed.

SUMMARY

Embodiments of the disclosure provide methods for the upstream desilication of brackish water to avoid scaling of the reverse osmosis membrane prior to desalination.

One aspect of the disclosure provides a method for removing silica from an aqueous solution, comprising flowing the aqueous solution into an electro-Fenton reactor, wherein the reactor comprises one or more electrodes in a bipolar arrangement positioned between a monopolar iron anode and a monopolar cathode; applying an electric current to the aqueous solution such that silica aggregates form on ferric hydroxide; and removing the silica aggregates from the aqueous solution.

In some embodiments, the one or more electrodes comprises eight iron electrodes. In some embodiments, the one or more electrodes are not electrically connected. In some embodiments, the electric current provides a current density of 4-10 A/$m^2$. In some embodiments, oxygen is continuously supplied to the reactor during the applying step. In some embodiments, the aqueous solution has a pH from 6-8. In some embodiments, the aqueous solution is brackish water.

Another aspect of the disclosure provides a method for removing silica and salt from an aqueous solution, comprising flowing the aqueous solution into an electro-Fenton reactor, wherein the reactor comprises one or more electrodes in a bipolar arrangement positioned between a monopolar iron anode and a monopolar cathode; applying an electric current to the aqueous solution such that silica aggregates form on ferric hydroxide; removing the silica aggregates from the aqueous solution; and flowing the aqueous solution through a reverse osmosis membrane.

DETAILED DESCRIPTION

Figure 1:
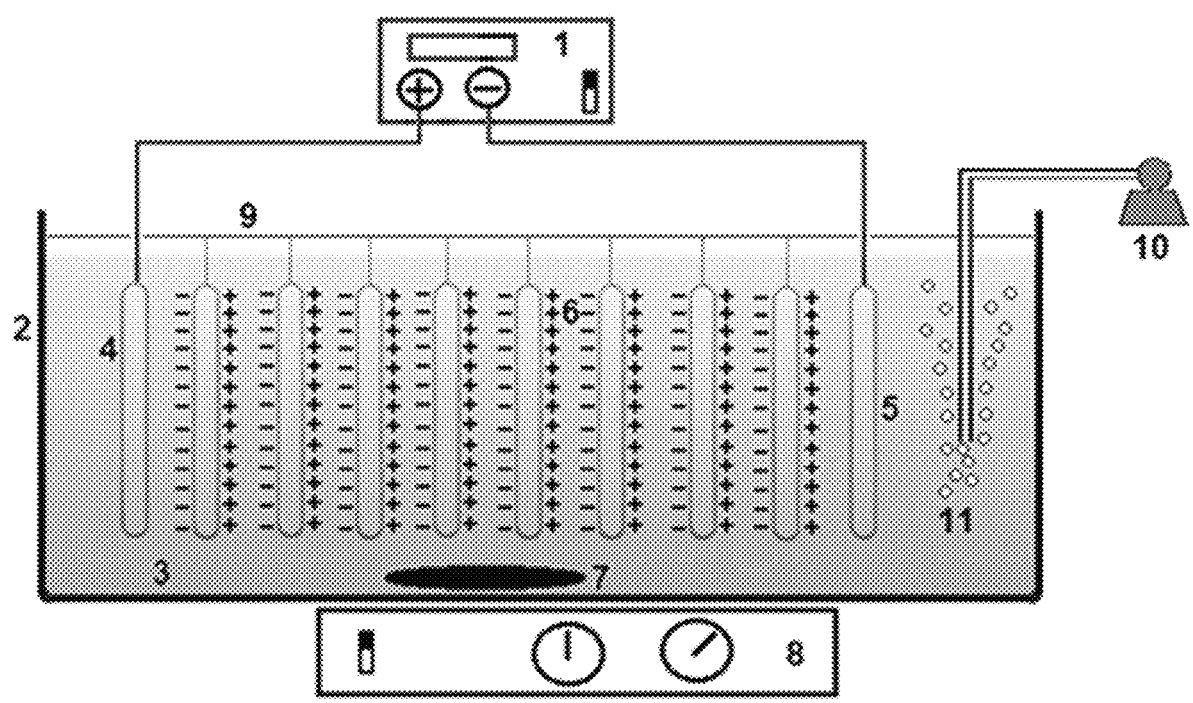
FIG. 1. Schematic diagram of the electro-Fenton batch reactor for silica removal.

Embodiments of the disclosure provide a pre-treatment technology based on the electro-Fenton advanced oxidation process for the effective removal of silica from aqueous solutions such as underground brackish water. In this environmentally friendly process, dissolved silica adsorbs on ferric hydroxide coagulant produced by the oxidation of ferrous ions from sacrificial iron anode. The matrix silica-ferric hydroxide precipitates and is then removed mechanically.

The electro-Fenton process is easily controlled due to the simplicity of its equipment and full automation may be achieved. The generated hydrogen bubbles facilitate the removal of pollutants by floating them on top of the tank and can then be easily collected. The sludge formed during the electro-Fenton process is non-toxic and can be easily disposed of. Further, no external chemicals are used (e.g. as in chemical coagulation with metal hydroxides or the use of antiscaling chemicals) and therefore there is no need for excess chemical neutralization. In addition, the process is performed at a natural water pH (7-8) and thus there is no need to adjust the pH.

The term "brackish water" refers to water having more salinity than fresh water but not as much as salt water. Typically, brackish water has a salinity ranging from about 0.1 parts per thousand (0.01%) to about 30 parts per thousand (3%). Brackish water typically has from 500 ppm to 10,000 ppm total dissolved solids, and especially water containing between 500 ppm and 5000 ppm total dissolved solids. The term "salt water" refers to water, typically ocean or seawater, having a salinity of about 30 parts per thousand (3%) or more, more typically of about 35 parts per thousand (3.5%) or more. Salt water typically has a total dissolved solids of about of about 35,000 ppm or more. Although seawater contains more than 70 elements, most seawater salts are ions of six major elements: chloride, sodium, sulfate, magnesium, calcium, and potassium.

The term "salinity" refers to the dissolved salt content of a body of water. It describes the levels of different salts such as sodium chloride, magnesium and calcium sulfates, and bicarbonates.

"Non-brackish" water refers to water containing from 100 ppm to 500 ppm total dissolved solids. "Potable water", which is that water suitable for human consumption, and has less than 250 ppm total dissolved solids. Usually potable water will have from 100 ppm to 250 ppm total dissolved solids. Water suitable for agricultural use can have more total dissolved solids, for example, from 200 ppm to 500 ppm total dissolved solids. "Wastewater" refers to a polluted form of water generated from rainwater runoff and human activities.

The term "aqueous solution" encompasses any of the water types as described herein. In some embodiments, the water used in the methods described herein has a salinity of at least 0.01% or more, e.g. at least about 0.1% or more. In some embodiments, the water has at least 500 ppm total dissolved solids, e.g. at least 1,000 ppm.

The chemistry of silica is quite complex. In brackish underground water it can be present in amorphous form of solubility 100 to 150 ppm or crystalline form of solubility 20 to 30 ppm at 25° C. (Gunnarsson and Arnórsson, 2000). It results from the weathering of silica containing rocks such as Albite (Sheikholeslami, et al., 2001).

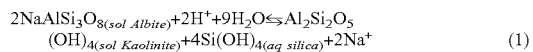

(1)

In some embodiments, the water used in the methods described herein has at least about 50 ppm silica, e.g. at least about 100 ppm.

Silica is present as soluble monosilicic, polysilicic or insoluble colloidal silica particles. In aqueous solutions, the monosilicic acid exists as orthosilicic $Si(OH)_4$. It is a weak acid ($pK_a \sim 9.8$) with silicon atom bonded to four OH groups at the vertices of a tetrahedron with the silicon at the center [Iler, 1979]. The successive dissociation of monosilicic acid is as the following:

 (2)

 (3)

 (4)

 (5)

with a net dissociation reaction

 (6)

At neutral pH of natural water, silica is present exclusively in the form of conjugate base, $SiO(OH)_3^-$ of the monosilicic acid, $Si(OH)_4$, (equilibrium 2) (Davis et al., 2002).

Silica adsorbs on a variety of metal ions having OH groups (in particular the ferric hydroxide $Fe(OH)_3$) to form hydro-complexes. This adsorption on ferric hydroxide and its precipitation are the basis for its removal from the feedwater before entering the RO process.

The electro-Fenton process combines the advantages of two advanced oxidation processes (AOP): the classical Fenton and electrochemical processes. With reference to FIG. 1, the electro-Fenton reactor, e.g. a batch reactor, may comprise an open tank filled with an aqueous solution, e.g. silica containing water. The tank may be formed from glass or a metal such as stainless steel. The tank may be sized to hold a volume of about 3-300,000 liters of aqueous solution. Immersed in the tank are one or more iron electrodes, e.g. 2-14 iron electrodes, e.g. about 8-10 iron electrodes. The electrodes may be equally spaced in parallel. The electrodes arranged at either end of the electrode arrangement are monopolar electrodes (cathode and anode) connected to the terminals of a power supply and the electrodes in between are mounted in bipolar arrangement with no electrical connection between them. The voltage applied between the anode and cathode by the power supply causes the polarization of the bipolar electrodes, presenting opposite polarities in the opposite faces. The reaction may be performed at room temperature, e.g. 23-27° C.

The iron electrodes may comprise 80-100 wt % Fe, e.g. at least about 90%, 95%, 96%, 97%, 98%, or 99% Fe.

In alternative embodiments, the electrodes are aluminum electrodes, e.g. the electrodes may comprise 80-100 wt % aluminum, e.g. at least about 90%, 95%, 96%, 97%, 98%, or 99% aluminum.

In an embodiment, the method for removing silica comprises flowing an aqueous solution into an electro-Fenton reactor as described herein. An electric current is applied to the aqueous solution such that silica aggregates form on ferric hydroxide coagulant produced by the oxidation of ferrous ions from sacrificial anode. Destabilization of the silica and its aggregation on the ferric hydroxide can either settle as sludge at the bottom of the reactor or form large flocs which are brought to the surface of the tank by the hydrogen gas bubbles. Thus, the matrix silica-ferric hydroxide precipitates may be mechanically removed from the aqueous solution, e.g. by skimming the water surface or through the use of filters. The sludge may be thickened prior to removal, e.g. by gravity thickening or dissolved-air flotation.

Several operational parameters including electrode configuration, current density, residence time and pH of the water may be varied. As described herein, the optimum electrode arrangement as far as the yield of silica removal and efficiency are concerned is the bipolar arrangement (FIG. 1).

The electric current density, defined as the amount of electric current flowing per unit cross-sectional area of the electrode, is another significant factor of the electro-Fenton process. The silica removal increases with increasing the current density owing to the increasing of $Fe^{3+}$ ions build up from $Fe^{2+}$ ions at the sacrificial anodes when high electric current density is used. In some embodiments, the electric current provides a current density of 4-10 A/m$^2$, e.g. about 6-8 A/m$^2$, e.g. about 7 A/m$^2$.

The effect of residence time (reaction time) on the silica removal by electro-Fenton process depends clearly on the extent of $Fe^{2+}$ ions generated by the electrodes. For higher residence times, the ion concentration and hydroxide flocs increase allowing higher yield of removal. In some embodiments, the residence time is about 10-100 minutes, e.g. at least about 15, 20, 25, 30, 35, 40 minutes or more.

Figure 3:
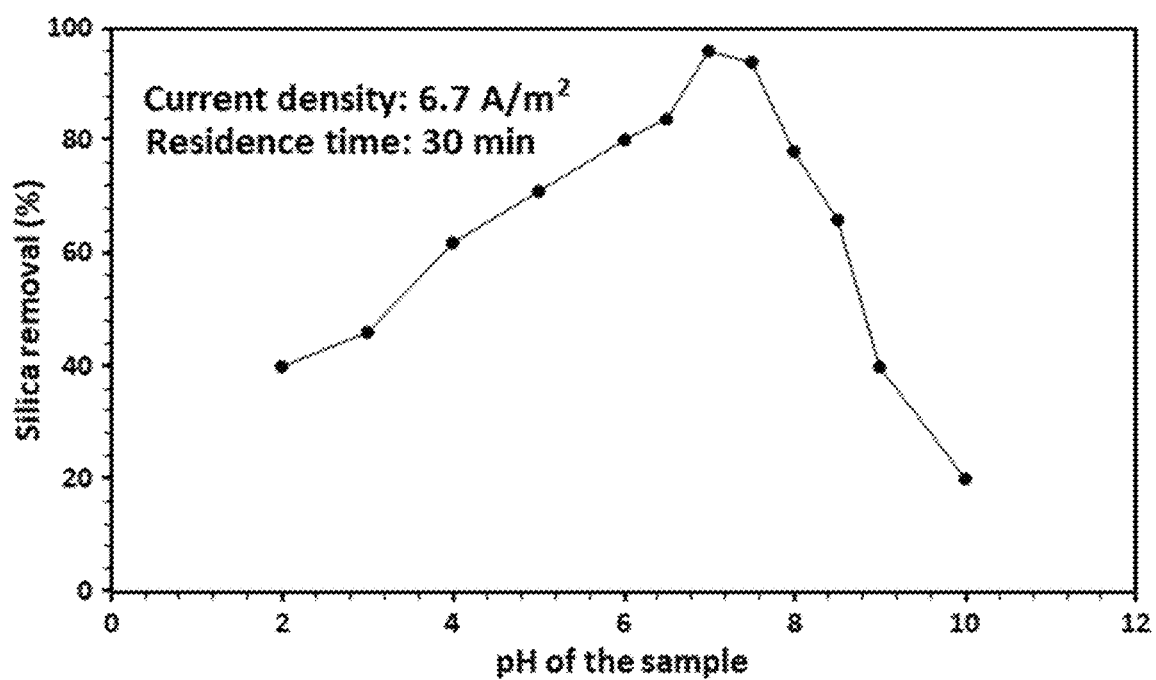
FIG. 3. Effect of pH of the raw water on silicate removal.

The pH of the water is another factor affecting the efficiency of the silica removal. As shown in the Example, the effect of the pH of the water on the performance of silica removal process was examined. In acidic water, the oxidation of ferrous to ferric hydroxide is very slow and neutral $Fe(OH)_3$ adsorbs on the neutral $Si(OH)_4$ by weak van der Walls attraction. At neutral pH (between pH 7 to pH 7.5), the ferrous ions are rapidly oxidized into ferric hydroxide and the adsorption process is maximum (94 to 96%) as seen in FIG. 3. It is due to the strong electrostatic attraction between the silicate anion $SiO(OH)_3^-$ and the ferric hydroxo-cation $(Fe(OH)^{2+}$

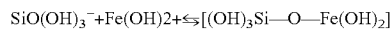

For a pH above 8, the surface charge on the ferric hydroxo-complex is negative and since the anion $SiO(OH)_3$ dominates at this pH anion repulsion prevents the occurrence of adsorption. Thus, the electro-Fenton process does not require preliminary adjustment of pH of the raw water, which stages a significant advantage because pH adjustment for a large quantity of wastewater is not cost-effective. In some embodiments, the aqueous solution has a pH from 6-8.

Figure 7:
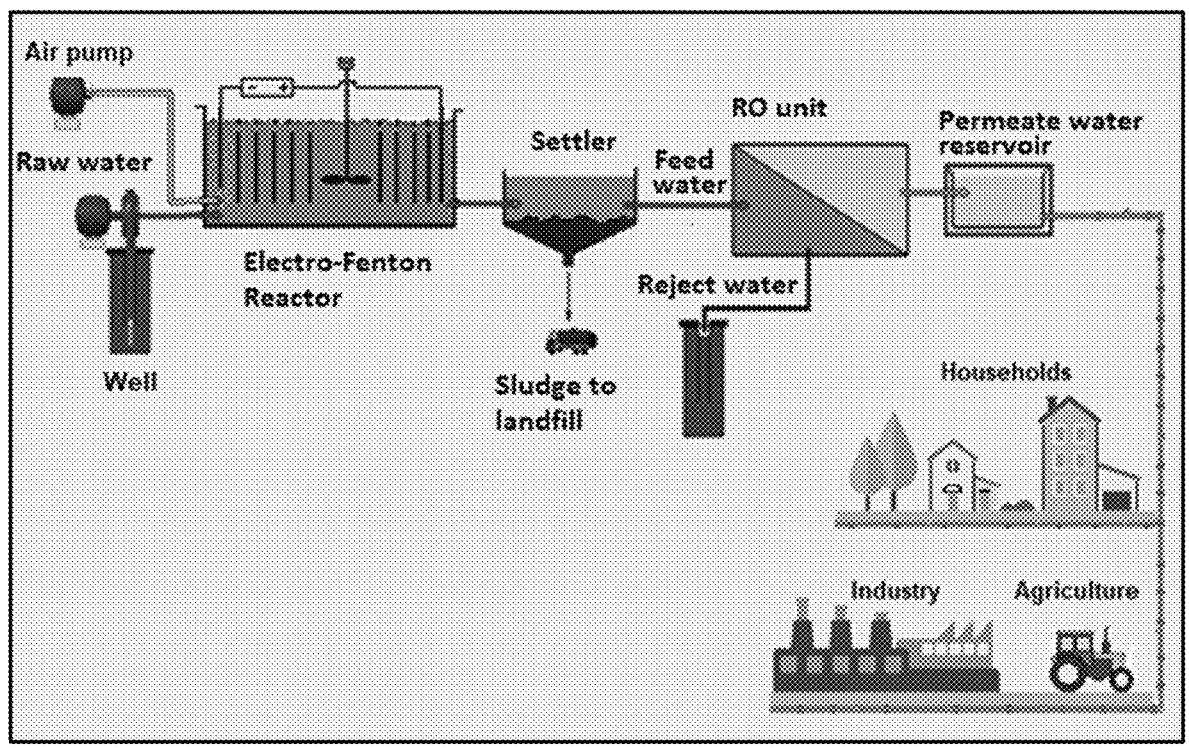
FIG. 7. Schematic diagram of a treatment plant using electro-Fenton process for the removal of silica from brackish underground water prior to its RO desalination and distribution.

With reference to FIG. 7, embodiments include a hybrid silica removal unit-reverse osmosis (RO) desalination system. RO systems are known and involve filters having extremely small pore sizes and relatively high operating pressures. In the RO process, water from a pressurized saline solution is separated from the dissolved salts by flowing through a water-permeable membrane. The permeate (the liquid flowing through the membrane) is encouraged to flow through the membrane by the pressure differential created between the pressurized feedwater and the product water, which is at near-atmospheric pressure. The remaining feedwater continues through the pressurized side of the reactor as brine. No heating or phase change takes place. The major energy requirement is for the initial pressurization of the feedwater. For brackish water desalination the operating pressures range from 250 to 400 psi, and for seawater desalination from 800 to 1,000 psi.

A silica removal unit for a RO plant will generate a feedwater with a minimum scaling potential. It was demonstrated that silica present in underground water can be alleviated by the electro-Fenton advanced oxidation process. This could successively prevent silica deposits on desalination membrane surface and avoid RO unit maintenance in order to reduce costs and increase the lifetime of the desalination unit. The main elements for the process are illustrated in FIG. 7. Raw underground brackish water pumped from wells is directed into an electro-Fenton reactor. The treated water is allowed to settle down as compact sludge, and the silica free water is sent into the RO unit for desalination. The permeate water is stored in reservoir before being used by different customers (e.g. households, industry, agriculture, etc.).

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

Example

Summary

Most of the inland cities and villages around the world rely on underground brackish water from deep non-renewable sedimentary aquifers as a water resource (McDonald et al., 2011) especially in countries facing harsh climate conditions for their domestic, industrial and agricultural purposes (Huang et al., 2019; Scanlon et al., 2006). However, silica concentration is high in this brackish water. This will cause its recalcitrant deposit on the reverse osmosis membrane during its desalination (Jiang et al., 2017). This is a very serious issue in the cost-effectiveness of freshwater production. Performance of a reverse osmosis membrane is greatly affected by the dissolved silica, reducing its lifetime and consequently is a main constraint parameter in water recovery rate. The silica deposit must be removed before feed water enters the membrane. This Example presents a novel pre-treatment technology based on the electro-Fenton advanced oxidation process for the effective removal of silica from underground brackish water. In this environmentally friendly process, dissolved silica adsorbs on ferric hydroxide coagulant produced by the oxidation of ferrous ions from sacrificial anode. The matrix silica-ferric hydroxide precipitates and is then removed mechanically.

Methods and Results

The electro-Fenton batch reactor comprised an open cuboid glass of 3000 mL (20 cm length, 15 cm width, 10 cm height) filled with silica containing water sample. Ten equally spaced in parallel and totally immersed planar rectangular (2 cm×5 cm) iron electrodes of 1 mm thickness were used. Two monopolar electrodes connected to the terminals of a DC power supply and eight electrodes mounted in bipolar arrangement with no electrical connection between them. The voltage applied between the anode and cathode by the power supply causes the polarization of the bipolar electrodes, presenting opposite polarities in the opposite faces. A 12-V DC power supply was used with variable intensity was used at room temperature (25° C.).

In this laboratory study, water samples were collected from the Salbukh (Saudi Arabia) desalination plant, [silica] =138 mg/L. Tests were carried out varying the following parameters: current density and operating time. Amounts of residual silica were measured by the silicomolybdate blue method (Coradin et al., 2004) using its near infra-red absorption at 0.81 μm with a molar extinction coefficient of $4.47 \times 10^5$ dm$^3$ mol$^{-1}$ cm$^{-1}$. The removal efficiency (in %) of silica was computed using the following equation:

$$\%R(t) = \frac{C(0) - C(t)}{C(0)} \times 100\% \quad (7)$$

where
C(0) is the silica concentration before its removal, and
C(t) is its concentration at time t after its removal.

Figure 2:
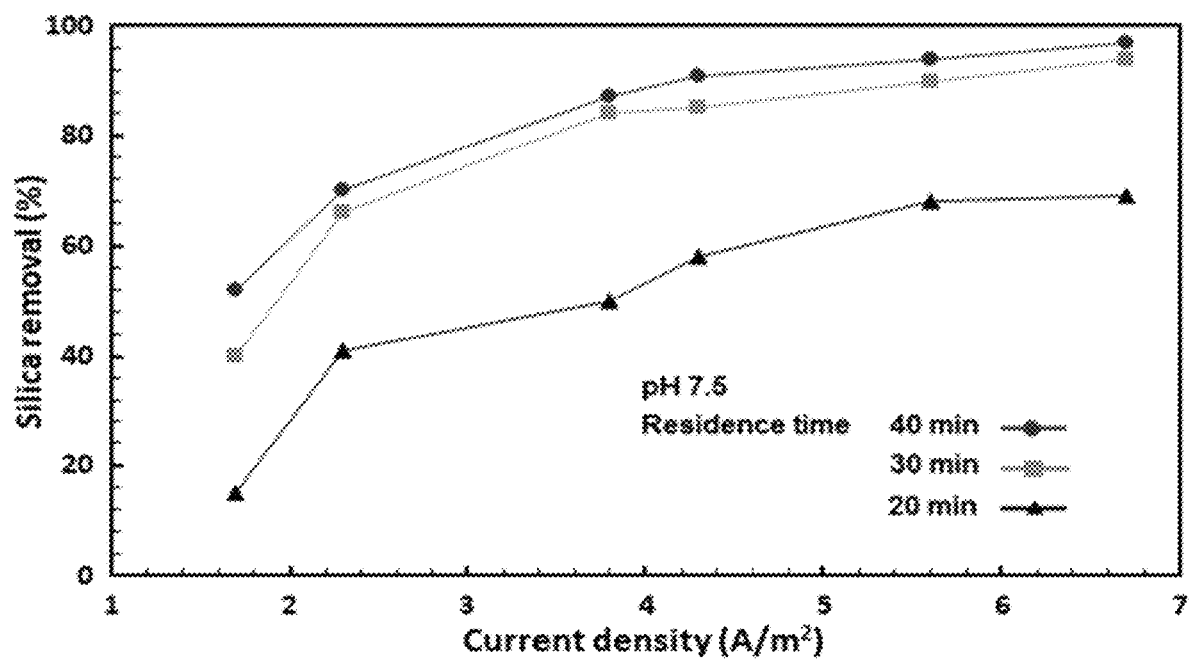
FIG. 2. Percent removal of silica by electro-Fenton process as function of current density at different residence times.

The percentage of removal of silica by the electro-Fenton process as function of current density for an operating time of 30 min is depicted in FIG. 2 where 94% of silica was removed during 30 min for a current density of around 7 A/m².

The effect of the pH of the raw water on the performance of silica removal process was examined by adding either sodium hydroxide (to make the raw water alkaline) or perchloric acid (to make the raw water acidic) to the raw water which were stirred for around 20 min. The adsorption of silica on ferric hydroxide proceeds mainly via van der Walls weak adsorption and charge neutralization. In acidic water, the oxidation of ferrous to ferric hydroxide is very slow and neutral Fe(OH)$_3$ adsorbs on the neutral Si(OH)$_4$ by weak van der Walls attraction. At neutral pH (between pH 7 to pH 7.5), the ferrous ions are rapidly oxidized into ferric hydroxide and the adsorption process is maximum (94 to 96%) as seen in FIG. 3.

Electro-Fenton Mechanism

Figure 4:
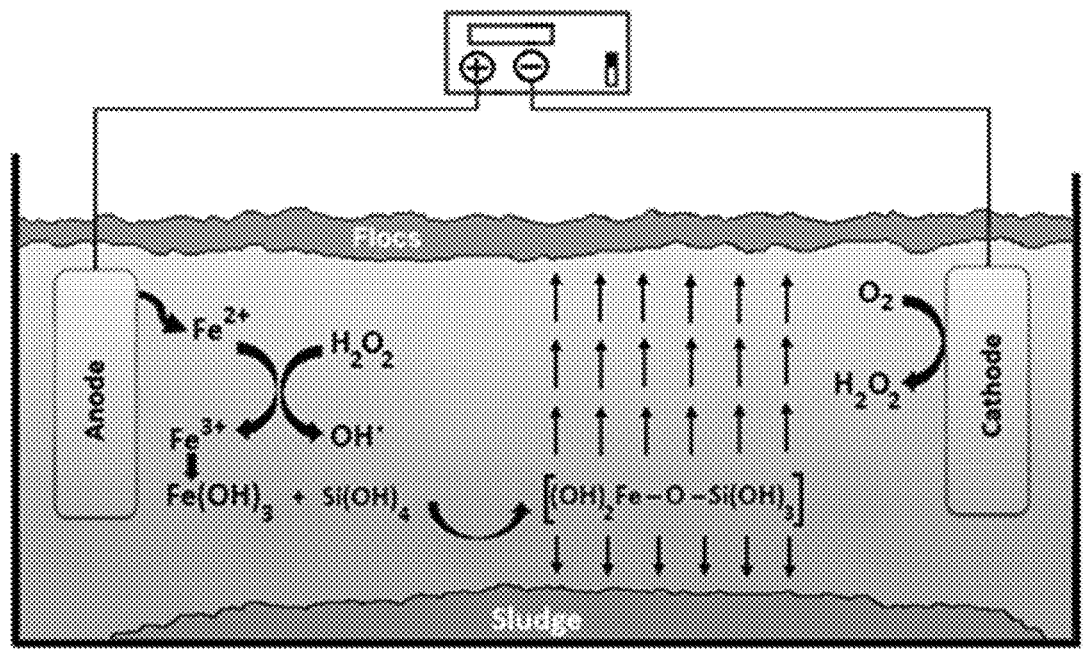
FIG. 4. Conceptual view of the electro-Fenton mechanism in the batch reactor involved in the removal of silica from brackish water.

The main mechanism of the electro-Fenton process is based on the production of the highly oxidizing species, the hydroxyl radical OH$^\bullet$ (FIG. 4). The electron Fenton process involves the generation of ferrous ions via two electron oxidation (electro-dissolution) of the sacrificial iron anode by applying a direct electric current (Ilhan et al., 2008). Hydrogen peroxide is continuously supplied to the bulk solution to provide the Fenton conditions:

At the anode:

$$Fe_{(s)} \rightarrow Fe^{2+}_{(aq)} + 2e^- \quad (8)$$

At the cathode:

$$2H_2O_{(l)} + 2e^- \rightarrow H_{2(g)} + 2OH^- \quad (9)$$

In situ cathodic generation of H$_2$O$_2$ at neutral pH by the oxygen reduction reaction through a two-electron pathway (Pang et al., 2020):

$$O_2 + 2H_2O + 2e^- \rightarrow H_2O_2 + 2OH^- \quad (10)$$

The silica containing water sample was initially bubbled with air for about 20 min prior to and during the removal of the silica to allow the oxygen to dissolve in the solution.

Highly oxidizing hydroxyl free radicals OH$^\bullet$ are generated by the catalytic oxidation of ferrous ion into ferric ion by hydrogen peroxide:

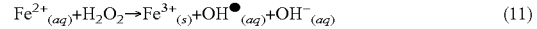
$$Fe^{2+}_{(aq)} + H_2O_2 \rightarrow Fe^{3+}_{(s)} + OH^\bullet_{(aq)} + OH^-_{(aq)} \quad (11)$$

The Fe$^{2+}$, as a catalyst, is continuously regenerated from the reduction of Fe$^{3+}$ on the cathode

$$Fe^{3+} + e^- \rightarrow Fe^{2+} \quad (12)$$

OH$^\bullet$ oxidizes Fe$^{2+}$ into Fe$^{3+}_{(aq)}$:

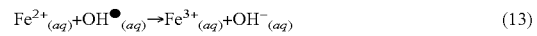
$$Fe^{2+}_{(aq)} + OH^\bullet_{(aq)} \rightarrow Fe^{3+}_{(aq)} + OH^-_{(aq)} \quad (13)$$

The water pH and dissolved oxygen play a crucial role in the oxidation of ferrous ions into ferric ions (Lakshmanan et al., 2009; Ben Sasson et al., 2009). In acidic media, the oxidation reaction is very slow, while in neutral medium, ferrous ions hydrolyze (reaction 14) and are rapidly oxidized into ferric hydroxide by dissolved oxygen (reaction 15).

$$Fe^{2+} + 2OH^- \rightarrow Fe(OH)_2 \quad (14)$$

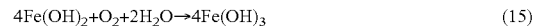
$$4Fe(OH)_2 + O_2 + 2H_2O \rightarrow 4Fe(OH)_3 \quad (15)$$

On the other hand, ferric and ferrous ions hydrolyze as ferric hydroxide:

$$Fe^{3+}_{(aq)} + 3OH^-_{(aq)} \rightarrow Fe(OH)_{3(s)} \quad (16)$$

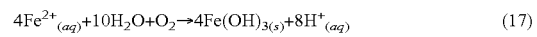
$$4Fe^{2+}_{(aq)} + 10H_2O + O_2 \rightarrow 4Fe(OH)_{3(s)} + 8H^+_{(aq)} \quad (17)$$

It should be noted that the electrocoagulation process, does not require preliminary adjustment of pH, which in itself stages a significant advantage because pH adjustment for a large quantity of wastewater is not cost-effective.

Adsorption of Silica on Ferric Hydroxide

Figure 5:
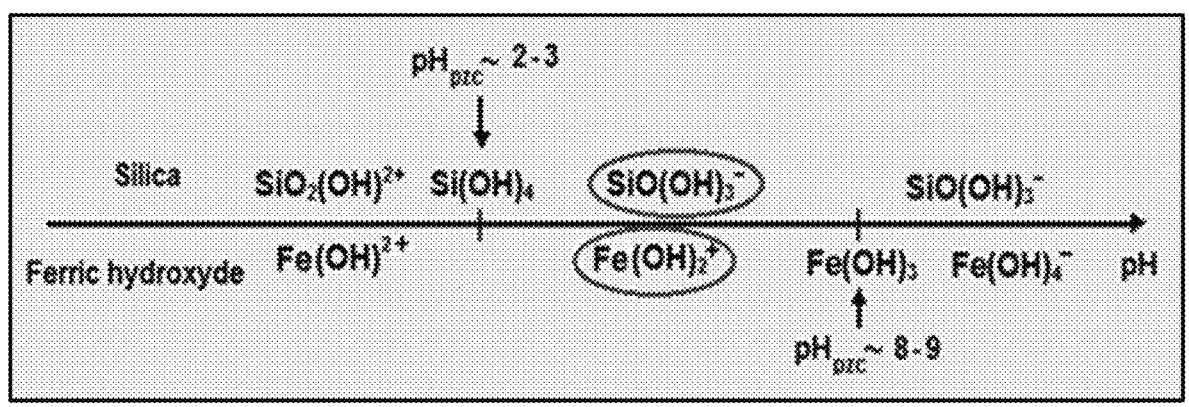
FIG. 5. pH point of zero charge of ferric hydroxide and silica.
Figure 6:
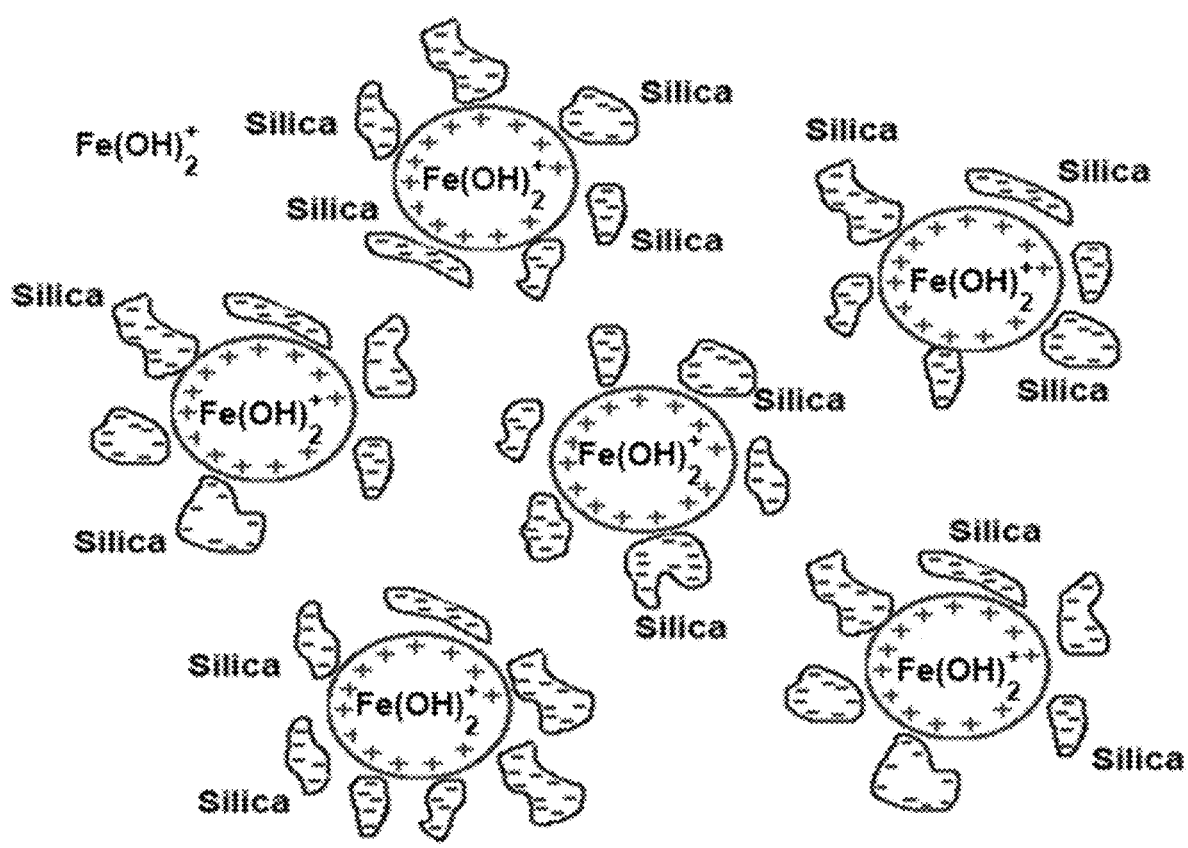
FIG. 6. Coagulation of silica on the ferric hydroxide forming flocs.

The pH point of zero charge ($pH_{pze}$) of $Fe(OH)_3$ and $Si(OH)_4$, pH at which this species exhibits no net electrical charge on their surface, are in the range 8-9 and 2-3 respectively (FIG. 5) (Joo et al., 2008). At neutral pH, the ferric hydroxide and the silicic acid are in the ionic forms, $(OH)_3SiO^-$ and $Fe(OH)_2^+$ respectively. The adsorption of silicic acid on ferric hydroxide stems from the electrostatic attraction between these two oppositely charged ions (FIG. 6). This charge destabilization leads to the formation of Fe—O—Si bridge (Bremere et al., 2000) according to the following stoichiometry:

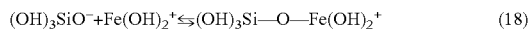

$$(OH)_3SiO^- + Fe(OH)_2^+ \leftrightarrows (OH)_3Si-O-Fe(OH)_2^+ \quad (18)$$

Destabilization of the silica and its aggregation on the ferric hydroxide can either settle as sludge at the bottom of the batch reactor or form large flocs which are brought to the surface of the tank by the hydrogen gas bubbles (Emamjomeh and Sivakumar, 2009). The sludge and/or floating flocs can then be mechanically removed.

Acknowledgment

This work was funded by Institutional Fund Projects under grant no (89-2021). Therefore, the inventor gratefully acknowledges the financial support of the Deanship of Scientific Research (DSR) and the technical support of the Center for Knowledge Economy and Technology Transfer (KETT) both of King Abdulaziz University, Jeddah, Saudi Arabia.

REFERENCES

Almazroui M., Nazrul Islam M., Dambul R., Jones P. D. Trends of temperature extremes in Saudi Arabia. International journal of Climatology, 34 (3), 2014, 808-826

Ben Sasson M., Calmano W., Adin A. Iron-oxidation processes in an electroflocculation (electrocoagulation) cell. J. Hazard. Mater., 171 (2009), pp. 704-709.

Biemans H., Speelman L H, Ludwig F., Moors E. J., Wiltshire A. J., Kumar P, Gerten D., Kabat P. Future water resources for food production in five South Asian river basins and potential for adaptation: A modeling study. Sci Total Environ. 2013, S117-S131, 468-469

Bremere, I., Kennedy, M., Mhyio, S., Jaljuli, A., Witkamp, G. J., Schippers, J., 2000. Prevention of silica scale in membrane systems: removal of monomer and polymer silica. Desalination 132, 89-100.

Brillas E, Casado J. Aniline degradation by electro-Fenton and peroxi-coagulation processes using a flow reactor for wastewater treatment. Chemosphere. 2002; 47(3):241-248

Chowdhury S., Al-Zahrani M. Characterizing water resources and trends of sector wise water consumptions in Saudi Arabia, J. King Saud Univ. Sci., 27 (2015) 68-82.

Coradin, T., Eglin, D., Livage, J., 2004. The silicomolybdic acid spectrophotometric method and its application to silicate/biopolymer interaction studies. Spectroscopy 18, 567-576.

Davis C. C., Chen H-W., Edwards M. Modeling Silica Sorption to Iron Hydroxide. Environ. Sci. Technol. 2002, 36, 4, 582-587

Emamjomeh M. M., Sivakumar M. 2009. Review of pollutants removed by electrocoagulation/flotation processes. Journal of Environmental Management 90(5): 1663-79

Greenlee L. F., Lawler D. F., Freeman B. D., Marrot B., Moulin Ph. (2009) Reverse osmosis desalination: Water sources, technology, and today's challenges. Water Research, 43 (9), 2317-2348

Gunnarsson I., Arnórsson S. Amorphous silica solubility and the thermodynamic properties of $H_4SiO°_4$ in the range of 0° to 350° C. at $P_{sat}$. Geochimica et Cosmochimica Acta 64 (13), 2000, 2295-2307

Guvenc S. Y., Dincer K., Varank G. (2019). Performance of electrocoagulation and electro-Fenton processes for treatment of nanofiltration concentrate of biologically stabilized landfill leachate. Journal of Water Process Engineering. 31, 100863

Henmi M, Fusaoka Y, Tomioka H, Kurihara M. High performance RO membranes for desalination and wastewater reclamation and their operation results. Water Sci Technol. 2010; 62(9):2134-40.

Huang F, Zhang Y, Zhang D, Chen X. Environmental Groundwater Depth for Groundwater-Dependent Terrestrial Ecosystems in Arid/Semiarid Regions: A Review. Int J Environ Res Public Health. 2019; 16(5):763. Published 2019 Mar. 3. doi:10.3390/ijerph16050763

Iler R K (1979) The Chemistry of Silica. Wiley, New York.

Ilhan, F., Kurt U, Apaydin O., Gonullu M. T. 2008. Treatment of leachate by electrocoagulation using aluminum and iron electrodes. J. Hazardous Mater., 154: 381-389.

Jiang S, Li Y, Ladewig B P. A review of reverse osmosis membrane fouling and control strategies. Sci Total Environ. 2017 Oct. 1; 595:567-583.

Joo J. H., Eberlein C. V., Morra M. J. (2008) Imazamethabenz hydrolysis on oxide surfaces at several pH. Journal of Pesticide Science 33 (4), 2008, 376-382

Kummu M., Guillaume J. H. A., de Moel H., Eisner S., Flörke M., Porkka M., Siebert T. I. E., Veldkamp S., Ward P. J. The world's road to water scarcity: shortage and stress in the 20th century and pathways towards sustainability. Scientific Reports volume 6, Article number: 38495 (2016)

Lakshmanan D, Clifford D. A., Samanta G. Ferrous and ferric ion generation during iron electrocoagulation. Environ. Sci. Technol., 43 (2009), pp. 3853-3859.

Liu R., Xue T., Song J., Wang Y., Qi T., Qu J., Du A. Removal of silicon in acid leaching and flocculation processes during zirconium oxychloride octahydrate production, Ceram. Int., 40 (2014) 8801-8808.

Lloyd J. W., Pim R. H. The hydrogeology and groundwater resources development of the Cambro-Ordovician sandstone aquifer in Saudi Arabia and Jordan, J. Hydrol., 121 (1990) 1-20.

Maadhah A. G., Wojcik C. K. Performance study of water desalination methods in Saudi Arabia, Desalination, 39 (1981) 205-217.

McDonald, R. I., Douglas, I., Revenga, C., Hale, R., Grimm, N., Grönwall, J., & Fekete, B. (2011). Global urban growth and the geography of water availability, quality, and delivery. Ambio, 40(5), 437-446. https://doi.org/10.1007/s13280-011-0152-6

Molinari R., Argurio P., Romeo L. Studies on interactions between membranes (RO and NF) and pollutants ($SiO_2$, $NO_3^-$, $Mn^{2+}$ and humic acid) in water, Desalination, 138 (2001) 271-281.

Nguyen T., Roddick F. A., Fan L. Biofouling of water treatment membranes: a review of the underlying causes, monitoring techniques and control measures. Membranes (Basel). 2012; 2(4): 804-840.

Nidheesh P, Gandhimathi R. Trends in electro-Fenton process for water and wastewater treatment: an overview. Desalination. 2012; 299:1-15.

Ning R. Y., Troyer T. L., Tominello R. S. Chemical control of colloidal fouling of reverse osmosis systems, Desalination, 172 (2005) 1-6

Pang Y., Xie H., Sun Y., Titirici M-M, Chai G-L. Electrochemical oxygen reduction for $H_2O_2$ production: catalysts, pH effects and mechanisms. J. Mater. Chem. A, 2020, 8, 24996

Pedenau P., Dang F. A New Water Treatment Scheme for Thermal Development: The SIBE Process, International Thermal Operations and Heavy Oil Symposium, Society of Petroleum Engineers, Calgary, Alberta, Canada, 2008.

Salvador Cob S., Hofs B., Maffezzoni C., Adamus J., Siegers V, Cornelissen E. R., Genceli Güner F. E., Witkamp G. J. Silica removal to prevent silica scaling in reverse osmosis membranes, Desalination, 344 (2014) 137-143.

Scanlon B. R., Keese K. E., Flint A. L., Flint L. E., Gaye C. B., Edmunds W. M., Simmers I. Global synthesis of groundwater recharge in semiarid and arid regions. Hydrol. Process. 2006; 20:3335-3370.

Semiat R., Sutzkover I., Hasson D. Scaling of RO membranes from silica supersaturated solutions, Desalination, 57 (2003) 169-191.

Sheikholeslami R., Al-Mutaz I. S., Koo T., Young A., 2001, Pretreatment and the effect of cations and inions on prevention of silica fouling, Desalination, 139, 83-95.

Siebert S., Burke J., Faures J. M., Frenken K., Hoogeveen J., Doll P., Portmann F. T. (2010) Groundwater use for irrigation—a global inventory. Hydrol Earth Syst Sci 14(10):1863-1880.

United nations, *World Water Development Report* 4. *World Water Assessment* Programme (WWAP), March 2012.

Velis M, Conti K I, Biermann F. Groundwater and human development: synergies and trade-offs within the context of the sustainable development goals. Sustain Sci. 2017; 12(6):1007-1017. doi:10.1007/s11625-017-0490-9

Wenten I. G., Khoiruddin (2016) Reverse osmosis applications: Prospect and challenges. Desalination, 391, 112-125

Xu G. R., Wang J. N., Li C. J. Strategies for improving the performance of the polyamide thin film composite (PA-TFC) reverse osmosis (RO) membranes: surface modifications and nanoparticles incorporations. Desalination, 328 (2013), pp. 83-100

Zhang H., Ran X., Wu X. Electro-Fenton treatment of mature landfill leachate in a continuous flow reactor. J Hazard Mater. 2012; 241:259-266.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

I claim:

1. A method for removing silica from an aqueous solution using an electro-Fenton oxidation process, comprising:
   flowing the aqueous solution into an electro-Fenton reactor, wherein the reactor comprises one or more electrodes in a bipolar arrangement positioned between a monopolar iron anode and a monopolar cathode;
   applying an electric current to the aqueous solution such that silica aggregates form on ferric hydroxide, wherein the aqueous solution is maintained at a temperature of 23-27° C., wherein oxygen is supplied to the reactor during the applying step in a manner such that hydrogen peroxide is formed, and wherein the hydrogen peroxide oxidizes ferrous ions into ferric ions to produce hydroxide ions which react with ferric ions to produce ferric hydroxide; and
   removing the silica aggregates formed on ferric hydroxide from the aqueous solution.

2. The method of claim 1, wherein the one or more electrodes comprises eight iron electrodes.

3. The method of claim 1, wherein the one or more electrodes are not electrically connected to each other.

4. The method of claim 1, wherein the electric current provides a current density of 4-10 A/m².

5. The method of claim 1, wherein the aqueous solution has a pH from 6-8.

6. The method of claim 1, wherein the aqueous solution is brackish water.

7. A method for removing silica and salt from an aqueous solution using an electro-Fenton oxidation process, comprising:
   flowing the aqueous solution into an electro-Fenton reactor, wherein the reactor comprises one or more electrodes in a bipolar arrangement positioned between a monopolar iron anode and a monopolar cathode;
   applying an electric current to the aqueous solution such that silica aggregates form on ferric hydroxide, wherein the aqueous solution is maintained at a temperature of 23-27° C., wherein oxygen is supplied to the reactor during the applying step in a manner such that hydrogen peroxide is formed, and wherein the hydrogen peroxide oxidizes ferrous ions into ferric ions to produce hydroxide ions which react with ferric ions to produce ferric hydroxide;
   removing the silica aggregates formed on ferric hydroxide from the aqueous solution; and
   flowing the aqueous solution through a reverse osmosis membrane.

* * * * *